(12) United States Patent
Wirz et al.

(10) Patent No.: US 7,720,222 B2
(45) Date of Patent: May 18, 2010

(54) METHOD FOR STORING AND TRANSMITTING DATA GENERATED BY SECURITY MODULE

(75) Inventors: Christian Wirz, Lausanne (CH); Olivier Brique, Le Mont-sur-Lausanne (CH); Xavier Carrel, Le Mont-sur-Lausanne (CH); Grégory Duval, La Conversion (CH); Patrick Hauert, Lausanne (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 859 days.

(21) Appl. No.: 10/542,924

(22) PCT Filed: Feb. 5, 2004

(86) PCT No.: PCT/IB2004/000344

§ 371 (c)(1), (2), (4) Date: Jul. 21, 2005

(87) PCT Pub. No.: WO2004/071106

PCT Pub. Date: Aug. 19, 2004

(65) Prior Publication Data

US 2006/0059507 A1    Mar. 16, 2006

(30) Foreign Application Priority Data

Feb. 6, 2003    (CH) ..................... 0178/03

(51) Int. Cl.
*H04N 7/167* (2006.01)
*H04L 29/06* (2006.01)

(52) U.S. Cl. .......................... 380/200; 726/9
(58) Field of Classification Search ........ None
See application file for complete search history.

(56) References Cited

U.S. PATENT DOCUMENTS 4,961,109 A    10/1990    Tanaka
5,774,546 A *  6/1998    Handelman et al. ......... 380/227
6,697,489 B1 * 2/2004    Candelore ................... 380/200

FOREIGN PATENT DOCUMENTS

EP              0 809 402 A    11/1997

* cited by examiner

*Primary Examiner*—Brandon S Hoffman
(74) *Attorney, Agent, or Firm*—Harness, Dickey & Pierce, P.L.C.

(57) ABSTRACT

The aim of this invention is to be able to recover specific information of a security module when it has been replaced by a new module in a user unit connected to a broadcasting network.

This aim is reached by a method of storage and transmission of information generated by a first security module connected to a user unit, this first security module comprising a unique identifier and information representative of its functioning, this first module being able to be replaced by a second security module, this method comprising the following steps:
  determination of the specific information contained in the first security module intended for transmission,
  transfer of this information in the user unit,
  storage of this information in the user unit,
  replacement of the first security module by the second security module,
  connection of the user unit on a transmission network,
  initialization of a communication between the second security module and a management center,
insertion by the user unit, of a data block in the blocks transmitted by the second module, this block comprising the identifier of the first module and the data specific to said first module.

9 Claims, 1 Drawing Sheet

METHOD FOR STORING AND TRANSMITTING DATA GENERATED BY SECURITY MODULE

BACKGROUND

This invention concerns the domain of data transmission in a network of apparatuses linked to a broadcasting center and without any permanent return connection.

In a Pay-TV network, it frequently occurs that the users' apparatuses receive control signals from a management center, these signals allowing the management of the access security to the broadcasted data.

Complex mechanisms have been developed so that many individual functions can be accessed without needing a connection to a management center.

Among these mechanisms, one can cite on demand access to contents thanks to the presence of a credit to be freely allocated to the event of one's choice.

"Contents" is understood as an information service concerning the stock-exchange, the weather forecast, general-interest television, a sporting event, etc. These contents can be broadcasted on the units of certain users such as a Pay-TV decoder, a computer or even a mobile phone, a palmtop, a PDA, a radio, a television or a multimedia terminal.

The digital flow is enciphered in order to be able to control the use thereof and to define certain conditions for such use. This encryption is made thanks to control words, which are changed at regular intervals (between 5 and 30 seconds) in order to deter any attack aiming to find such a control word.

The user unit includes a security module, generally removable, which manages the security operations such as the verification of the rights and the decryption of the necessary keys (control words) for the decoder to access the transmitted data.

The accounting of use of such contents is today based on the principle of the subscription or event purchasing. Subscription allows the definition of a right associated with one or more broadcasting channels and allows the user to access these channels in clear if the right exists in his security unit.

At the same time, it is possible to define rights pertaining to a particular content, such as a film or a football match. The user can acquire this right (purchase for example) and this content will be specifically managed by this right. This method is known under the term impulse purchasing (pay-per-view PPV).

During the decryption of the control words, it will be verified if a right associated with the access conditions is present in the security module.

Whenever the comparison is positive the control word is returned in clear to the user unit.

Some users' units have a back channel to communicate the user's choice and therefore to acquire the rights pertaining to a particular choice. This channel is generally a modem connected to a telephone line or to a network. Due to the reluctance of certain people to any form of supervision on the actual consumption of the contents, the cable is simply not linked to the phone line socket and the data is not transmitted to the management center. It may be that this connection is not carried out for practical reasons, for example because the phone line socket is too far from the TV set.

At the time of establishing a security module for a new client, a credit is usually attributed to him allowing him to test the practicality of the impulse buy. This credit is not invoiced to the client, because it may never be used.

In normal operation conditions, the user buys one or two films with this credit and connects his user unit for reloading. At this moment, the management center establishes the invoice for the two films purchased and reloads the module with the amount that has previously been agreed upon with the user.

The management center cannot invoice the consumption carried out on this initial credit until the user connects his unit to a network. In this way, the total amount of the non-invoiced credits on all the security units can be considerable.

Actions have been taken such as the proposal of games to encourage, by the distribution of a price, the users to connect their unit.

The problem definitively arises when a change of security module is carried out, in general for technological evolution reasons. The operator is satisfied when the user carries out this exchange on time and it is difficult to oblige the user to return his old card with the aim of invoicing services. In this way, the credit use accounting data contained in the previous module is considered as lost.

SUMMARY

Example embodiments relate to recover the information relating to the use of the credit on a security module and to transmit this information to a management center.

Example embodiment relate to a storage and transmission method of information generated by a first security module connected to a user unit. The first security module may include a unique identifier and information representative of its functioning, this first module being able to be replaced by a second security module, this method comprising the following steps:

- determination of the specific information contained in the first security module intended for transmission,
- transfer of this information in the user unit,
- storage of this information in the user unit,
- replacement of the first security module by the second security module,
- connection of the user unit on a transmission network,
- initialization of a communication between the second security module and a management center,
- insertion by the user unit, of a data block in the blocks transmitted by the second module, this block comprising the identifier of the first module and the data specific to said first module.

This method allows the recovery of data in a first security module while the connection with the management center is made thanks to the second security module.

The security module exchange represents an opportunity to request this connection to initialize the new module.

The specific information represents all the data that is locally generated and, therefore, which is unknown to the management center. In addition to the information concerning impulse purchases, there are several statistical counters on the actual use of the user unit or decoder as well as information related to the versions of the security module functionalities.

During this connection, the decoder will constitute a data block which identification will be different from the other blocks coming from the security module. A block is constituted by a header comprising the unique number of the security module and data generally enciphered by a key, which is either a transmission key that is common to all the security units or a personal key, that is to say, pertaining to a security module. This key can be of the symmetrical or asymmetrical type. The data flow will thus comprise blocks which identifier is the one of the new security module and a block which identifier is the one of the previous security module. These blocks are transmitted during a same session.

BRIEF DESCRIPTIONS OF DRAWINGS

The invention will be better understood thanks to the following detailed description, which refers to the enclosed drawings given as non-limitative examples, namely:

DETAILED DESCRIPTION OF EXAMPLE EMBODIMENTS

Figure 1:
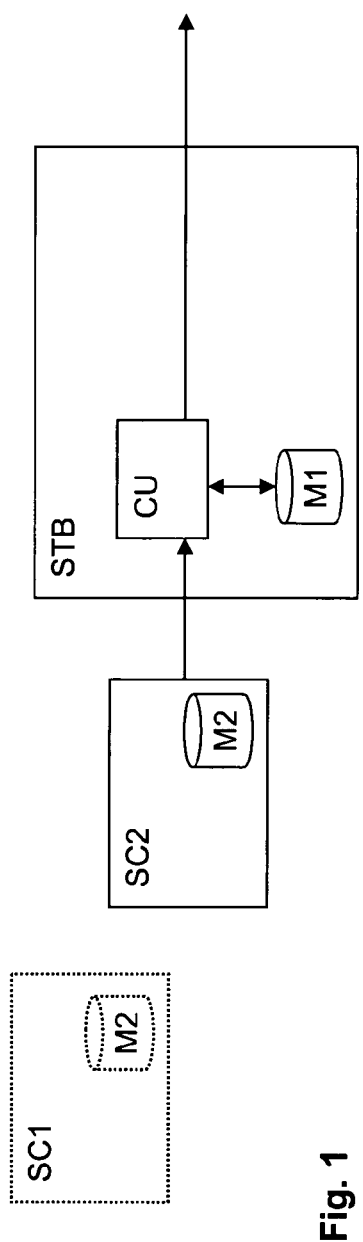
FIG. 1 shows the different elements of the invention.

In FIG. 1, the decoder STB has an non-volatile memory M1. This memory will be used for storing the data coming from the security module SC currently connected. In our example, the SC1 security module has been withdrawn from the decoder STB and replaced by the new module SC2.

According to the chosen operating mode, the data pertaining to the security module is exported from the memory M2 of the security module to a memory M1 intended for this data, which is located in the decoder STB. This transfer can be carried out for example each time the content of the memory M2 is modified, or at regular interval, or even by a command issued from the management center.

Associated with this data, the security module adds an identifier such as the unique number UA. The data is transmitted from the security module SC towards the processing unit MC of the decoder. This unit manages the communication with the management center and the storage of the data in memory M1.

The data stored in memory M1 can be encrypted by a local key specific to the decoder. This data is for example accompanied by a signature calculated by the security module SC and authenticating the set of data. Therefore, in the case of its modification in the decoder, the management center could easily detect such modification. The signature uses an asymmetrical key whose corresponding part is contained in the management center. The unique identifier allows finding the key for decrypting the signature in the secured memory of the management center and verifying if the received data is correct.

Figure 2:
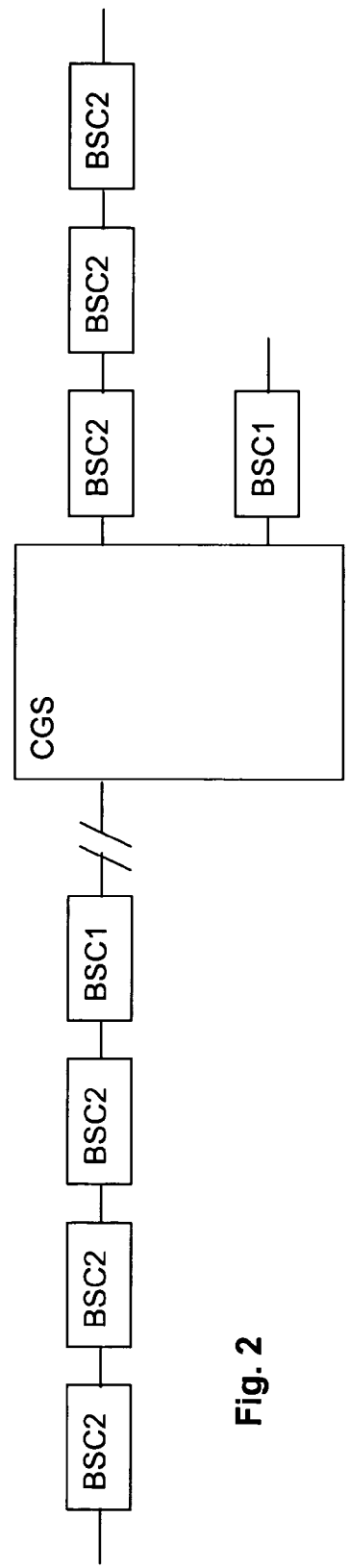
FIG. 2 shows the data block processing.

In FIG. 2 an example of the data blocks BCS transmitted towards the management center is disclosed. During the connection of the decoder to the management center, the processing unit MC requests the data to the connected security module SC and transmits the blocks BSC2 coming from the module SC2. The processing unit MC will also take back the data stored in memory M1, which in our case corresponds to the data pertaining to the previous security module SC1. This data is transmitted in the form of the block BSC1.

According to an embodiment, the management center CGS includes a separation module, which allows the sorting and the appropriate processing of the blocks. In fact, the input module is in principle configured to verify that each block comes from the same source and thus includes the same identifier. For this reason it is important to separate the blocks for processing in a conventional way, at least for the part of the blocks BSC2. The block BSC1 will have a specific processing precisely in the aim to recover information concerning no longer connected security modules.

In order to avoid losing the data stored in the decoder STB memory by the replacement of the data pertaining to the new security module SC2, the management center disposes a control to activate, in the security module connected to the decoder, the data transfer operation towards the decoder.

Therefore, during a module change, the new module is initially not authorized to transfer its data and the data contained in the memory M1 is representative of the previous security module.

The management center will wait for this information according to the above-described method. Once this information is processed, the management center sends a command to authorize the security module to transmit its information towards the decoder and therefore to update the contents of the memory M1.

The invention claimed is:

1. A method of storing and transmitting information generated by a first security module connected to a user unit, the first security module includes a unique identifier and specific information representative of its functioning, the first security module being able to be replaced by a second security module, the method comprising:

determining the specific information contained in the first security module intended for transmission, transferring the specific information of the first security module into the user unit, storing the specific information of the first security module in the user unit, replacing the first security module by the second security module, connecting the user unit on a management center via a transmission network, initializing a transfer of information between the second security module and the management center via the user unit, and inserting by the user unit, a data block in data blocks of the information transmitted by the second security module to the management center, the data block includes the identifier and the specific information of the first security module previously stored in the user unit.

2. The method of storing and transmitting according to claim 1, wherein the transfer of the specific information of the first security module is carried out at regular interval.

3. The method of storing and transmitting according to claim 2, wherein the transfer of the specific information is stopped after the replacement of the first security module by the second security module.

4. The method of storing and transmitting according to claim 1, wherein the transfer of the specific information of the first security module is carried out each time the information is modified.

5. The method of storing and transmitting according to claim 4, wherein the transfer of the specific information is stopped after the replacement of the first security module by the second security module.

6. The method of storing and transmitting according to claim 1, wherein the transfer of the specific information is stopped after the replacement of the first security module by the second security module.

7. The method of storing and transmitting according to claim 6, wherein the transfer of the specific information is authorized as soon as a successful connection with the management center has been carried out.

8. The method of storing and transmitting according to claim 6, wherein the transfer of the specific information is authorized by a command sent by the management center.

9. The method of storing and transmitting according to claim 1, wherein the specific information are stored in the user unit while the first security module is removed.

* * * * *